(12) United States Patent
Elliott et al.

(10) Patent No.: US 8,098,061 B2
(45) Date of Patent: Jan. 17, 2012

(54) LINEAR INDUCTIVE POSITION SENSOR

(75) Inventors: Ryan W. Elliott, Chatham (CA); Joong K. Lee, Chatham (CA); Lingmin Shao, Ridgetown (CA)

(73) Assignee: KSR Technologies Co., Ridgetown (CA)

( * ) Notice: Subject to any disclaimer, the term of this patent is extended or adjusted under 35 U.S.C. 154(b) by 175 days.

(21) Appl. No.: 12/420,328

(22) Filed: Apr. 8, 2009

(65) Prior Publication Data

US 2009/0256555 A1    Oct. 15, 2009

Related U.S. Application Data

(60) Provisional application No. 61/045,014, filed on Apr. 15, 2008.

(51) Int. Cl.
*G01B 7/14*    (2006.01)
(52) U.S. Cl. ......... 324/207.15; 324/207.16; 324/207.17; 324/207.24
(58) Field of Classification Search .......... 324/207.13–207.19, 207.24
See application file for complete search history.

(56) References Cited

U.S. PATENT DOCUMENTS 7,276,897 B2   10/2007 Lee
2007/0001666 A1   1/2007 Lee

OTHER PUBLICATIONS

International Search Report and Written Opinion dated Aug. 5, 2009. PCT/IB2009/005233.

*Primary Examiner* — Reena Aurora
(74) *Attorney, Agent, or Firm* — Gifford, Krass, Sprinkle, Anderson & Citkowski, P.C.

(57) ABSTRACT

A linear position sensor having a transmitter coil which generates electromagnetic radiation when excited by a source of electrical energy and wound in a first direction. A receiver coil is contained within the transmitter coil and the receiver coil includes both a first loop wound in a first direction and a second loop wound in the opposite direction. A coupler element linearly moves along a first direction relative to the transmitter coil which varies the inductive coupling between the transmitter coil and the receiver coil as a function of the linear position of the coupler element to thereby vary the electrical output signal from the receiver coil when excited by the transmitter coil. The first and second loops of the receiver coil are linearly aligned with each other along the first direction.

9 Claims, 1 Drawing Sheet

LINEAR INDUCTIVE POSITION SENSOR

CROSS REFERENCE TO RELATED APPLICATIONS

This application claims priority of U.S. Provisional Patent Application Ser. No. 61/045,014 filed Apr. 15, 2008, which is incorporated herein by reference.

BACKGROUND OF THE INVENTION

I. Field of the Invention

The present invention relates generally to position sensors and, more particularly, to a linear inductive position sensor.

II. Description of Related Art

Modern automotive vehicles typically include a plurality of different position sensors which generate an electric signal indicative of the position of the sensor. While some position sensors generate an electrical signal output representative of the rotational position of a sensor element, other position sensors are linear sensors which generate an electrical output signal representative of the linear position of the sensor element.

Many of the previously known sensors are formed on a printed circuit board and include an exciter or transmitter coil which is electrically excited at a high frequency AC source, such as a 2.4 megahertz AC source. A receiver coil is positioned in close proximity to the exciter coil and oftentimes within the interior of the exciter coil so that the exciter coil induces a voltage in the receiver coil.

Typically, the exciter coil is wound in a single direction and includes a plurality of loops formed on a printed circuit board while a receiver coil is formed on the printed circuit board and includes two or more oppositely wound loops. In the previously known linear inductive position sensors, a coupler element constructed of a metallic material is linearly movable relative to both the receiver coil and the exciter coil along a first direction. This coupler element interferes with the inductive coupling between the exciter coil and the receiver coil in an amount which varies linearly between the oppositely wound loops of the receiver coil as the coupler element is moved along a first direction from one end of the exciter and receiver coils and to the other end of the exciter and receiver coils. This, in turn, ideally varies the voltage output of the receiver coil linearly in synchronism with the movement of the coupler element.

The receiver coils for these previously known linear inductive position sensors have been designed so that the loops of the receiver coil have been positioned side by side to each other not only in the direction of movement of the coupler element, but also in the direction normal to the movement of the coupler element. This disadvantageously increases the overall fabrication cost of the inductive sensor and also increases the error of the output signal that may be caused by tilting of the coupler element relative to the exciter and receiver coils.

SUMMARY OF THE PRESENT INVENTION

The present invention provides a linear inductive position sensor which overcomes the above-mentioned disadvantages of the previously known linear sensors.

In brief, the sensor of the present invention includes a transmitter coil which generates electromagnetic radiation when excited by a source of electrical energy, such as a high frequency AC source. The transmitter coil is wound in a single direction and, in the preferred embodiment, is formed on a printed circuit board.

A receiver coil is also contained within the interior of the transmitter coil. This receiver coil which is also formed on the printed circuit board includes a first loop wound in a first direction and a second loop wound in a second direction opposite from the first direction.

A coupler element is linearly movable along a first direction relative to the transmitter and receiver coils. The coupler element is constructed of a metallic material which varies the inductive coupling between the transmitter coil and the receiver coil as a function of the linear position of the coupler element. In doing so, the coupler element varies the electrical output signal from the receiver coil when excited by the transmitter coil as a function of the position of the coupler element.

Unlike the previously known receiver coils, however, the first and second loops of the receiver coil are linearly aligned and adjacent with each other along the first direction, i.e. the direction of movement of the coupler element. Such a configuration not only simplifies the fabrication of the receiver coil, but also reduces the amount of error caused by tilting of the coupler element.

In order to further reduce the error in the signal from the receiver coil caused by tilting of the coupler element, the coupler element optionally is U-shaped so that the coupler element overlies both the top as well as the bottom of the receiver and transmitter coils. Thus, any increase in the inductive coupling caused by tilting of the coupler element on the top of the transmitter and receiver coils is offset by a reduced coupling on the bottom of the transmitter and receiver coils, and vice versa.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
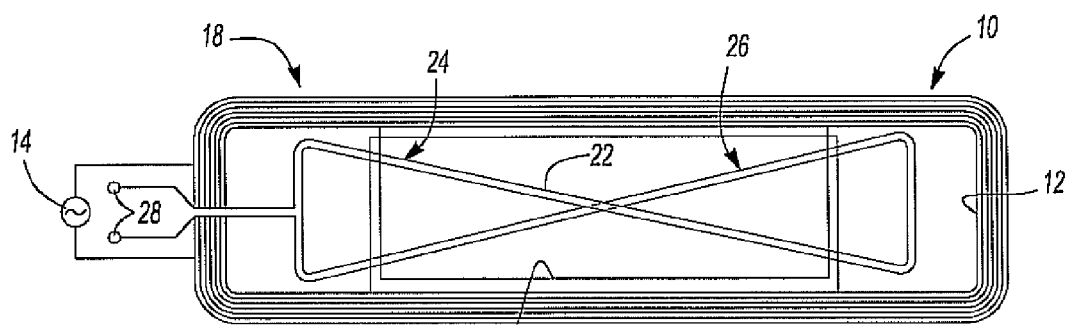
FIG. 1 is a plan view illustrating a first embodiment of the present invention.

With reference first to FIG. 1, an improved linear inductive sensor 10 is shown having a multi-loop transmitter coil 12. The loops of the transmitter coil 12 are all wound in the same direction and the transmitter coil is excited by a high frequency AC source 14. For example, for automotive applications, the frequency of the AC source 14 is typically in the range of about 2.4 megahertz.

A reference coil 16 is also provided so that a portion of the reference coil 16 is wound around each end 18 and 20 of the sensor 10. The reference coil 16 provides a means for compensating for temperature, environmental factors, etc. in the well-known fashion.

A receiver coil 22 can be contained either partially or entirely within the interior of the transmitter coil 12. The receiver coil 22 is in the form of a bowtie and includes two linearly aligned and adjacent portions 24 and 26. These portions 24 and 26 of the receiver coil 22, furthermore, are oppositely wound from each other.

The oppositely wound portions 24 and 26 of the receiver coil 22 are substantially the same size as each other and have the same relative spacing from the transmitter coil 12 as each other. Consequently, as shown in FIG. 1, upon excitation of the transmitter coil 12 by the AC source the outputs 28 of the receiver coil 22 would exhibit a zero voltage since the voltage induced by the transmitter coil 12 in the first portion 24 of the receiver coil 22 is offset by the oppositely wound portion 26 of the receiver coil 29.

Figure 2:
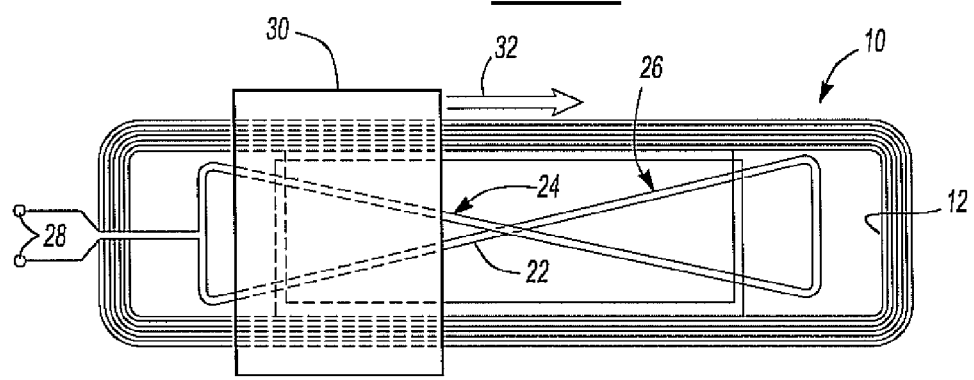
FIG. 2 is a view similar to FIG. 1, but illustrating a coupling element used in conjunction with the coils of the sensor.

With reference now to FIG. 2, in order to provide a meaningful output signal from the sensor 10, a coupler element 30 constructed of a metallic material is linearly movable in the direction indicated by arrow 32 along the sensor 10. The coupler element 30, depending upon its position, variably interferes with the inductive coupling between the transmitter coil 12 and the receiver coil 22. Consequently, as the coupler element 30 moves along the sensor 10, the inductive coupling between the transmitter coil 12 and the oppositely wound portions 24 and 26 of the receiver coil 22 will vary thus varying the output voltage on the outputs 28 from the receiver coil 22 in an amount proportional to the linear position of the coupler element 30 relative to the sensor 10.

In practice, the transmitter coil 12, receiver coil 22 and reference coil 16 are all formed on a printed circuit board. The bowtie configuration of the receiver coil 22 reduces the complexity of the printed circuit board fabrication thus reducing the overall cost but without the loss of operational performance.

Figure 3:
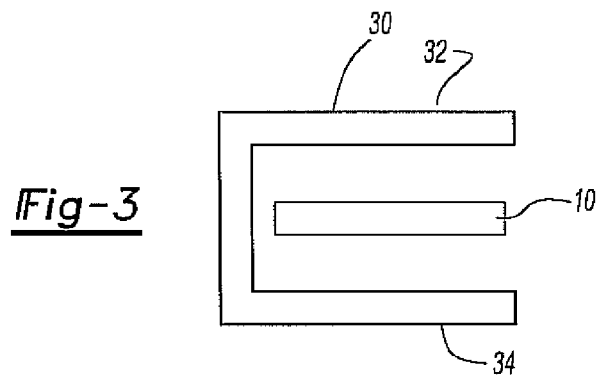
FIG. 3 is a view of an alternative coupler element used with the sensor.

With reference now to FIG. 3, an improved coupler element 30 is shown which is generally U-shaped in cross-sectional shape so that one leg 32 of the coupler is positioned on top of the printed circuit board for the sensor 10 while the other leg 34 is positioned on the bottom of the printed circuit board for the sensor 10. Both legs 32 and 34 effect the inductive coupling between the transmitter coil 12 and the receiver coil 22 of the sensor 10. However, the coupler may alternately have a flat regular shape.

An advantage of the U-shaped coupler element 30, however, is that any tilting or gap variation of the coupler element 30 relative to the sensor printed circuit board is automatically compensated. For example, as the gap between the printed circuit board for the sensor 10 and the first leg 32 increases, thus reducing the inductive coupling of the coupler element 30, the inductive coupling between the sensor 10 and the other leg 34 of the coupler element 30 increases thus automatically compensating for small gap variations between the coupling element 30 and the sensor printed circuit board. Likewise, the U-shaped configuration 30 also automatically compensates for any tilting of the coupler element 30 relative to the sensor printed circuit board.

Figure 4:
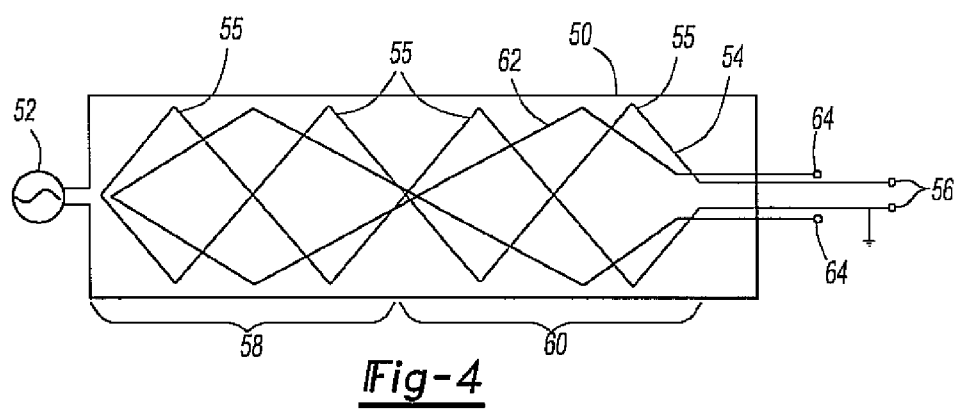
FIG. 4 is a view similar to FIG. 1, but illustrating a modification thereof.

With reference now to FIG. 4, a still further improvement for a 360° rotational sensor is shown having an exciting coil 50 which forms a closed loop. A high frequency AC source 52 is connected to the exciter or transmitter coil to produce the magnetic field in the known fashion.

A receiver coil 54 is contained within the transmitter coil 50. The receiver coil illustrated in FIG. 4 is in the form of a sawtooth pattern having four poles. As such, the receiver coil 54 forms two moduli 58 and 60 within the transmitter coil 50. A coupler (not shown) travels across the receiver coil in order to vary the coupling between the transmitter coil 50 and the receiver coil 54 in the previously described fashion. However, the output 56 from the receiver coil 54 will repeat between the first modulus 58 or 0°-180° revolution and the second modulus 60 or 180°-360° revolution. As such, since the output signal on the receiver coil output 56 repeats, the precise position of the coupling element would be unknown.

In order to obtain precise rotational position of the coupling element, a second receiver coil 62 having a single modulus and outputs 64 are provided coextensively with the first receiver coil 54. Consequently, the signal from the outputs 56 of the first receiver coil 54 when combined with the output signal on the output 64 of the second receiver coil 62 will provide an exact position of the coupler along the receiver coils 54 and 62 from 0° to 360°.

It will also be understood that, even though the sensor illustrated in FIG. 4 is illustrated as a linear sensor, the sensor may be wound into a circular shape and thus used with a rotary coupling element.

From the foregoing, it can be seen that the present invention provides an improved linear actuator which overcomes the previously known disadvantages of the previously known linear actuators.

Having described our invention, however, many modifications thereto will become apparent to those skilled in the art to which it pertains without deviation from the spirit of the invention as defined by the scope of the appended claims.

We claim:

1. A linear inductive position sensor comprising:

a transmitter coil which generates electromagnetic radiation when excited by a source of electrical energy, said transmitter coil being wound in a first direction, a receiver coil contained within said transmitter coil, said receiver having a first loop wound in a first direction and a second loop wound in a second direction opposite from said first direction, a coupler element linearly movable in a first direction relative to said transmitter coil which varies the inductive coupling between said transmitter coil and said receiver coil as a function of the linear position of said coupler element to thereby vary the electrical output signal from said receiver coil when excited by said transmitter coil, and said receiver coil having a first and a second spaced ends along said first direction, said first loop of said receiver coil extending a position adjacent one end of said transmitter coil and to a central portion of said transmitter coil and a second loop extending from said central portion of said transmitter coil to a position adjacent the other end of said transmitter coil so that said first and second loops of said receiver coil are positioned adjacent each other along said first direction, said first and second loops being aligned with each other along said first direction such that a line extending along said first direction which bisects said first loop of said receiver coil also bisects said second loop of said receiver coil, wherein said first and second loops of said receiver coil are triangular in shape and wherein said coupler element has a length in said first direction less than the length in said first direction of either said first or second loops of said receiver coil.

2. The position sensor as defined in claim 1 wherein said transmitter coil is formed on a printed circuit board.

3. The position sensor as defined in claim 1 wherein said receiver coil is formed on a printed circuit board.

4. The position sensor as defined in claim 1 wherein said coupler element is made of a metallic material.

5. The position sensor as defined in claim 1 wherein said transmitter coil and said receiver coil are both formed on a printed circuit board having a top and a bottom.

6. The position sensor as defined in claim 5 wherein said coupler element includes portions overlying said top and said bottom of said printed circuit board.

7. The position sensor as defined in claim 6 wherein said coupler element is generally U-shaped in cross section.

8. The position sensor as defined in claim 1 and comprising a compensating coil having two oppositely wound loops within said transmitter coil.

9. The position sensor as defined in claim 1 wherein said loops of said receiver coil are symmetrical.

* * * * *